July 14, 1925.
J. B. VIDACH
1,546,331
DOUBLE ACTION UNIVERSAL BUMPER
Filed Aug. 4, 1924     3 Sheets-Sheet 1
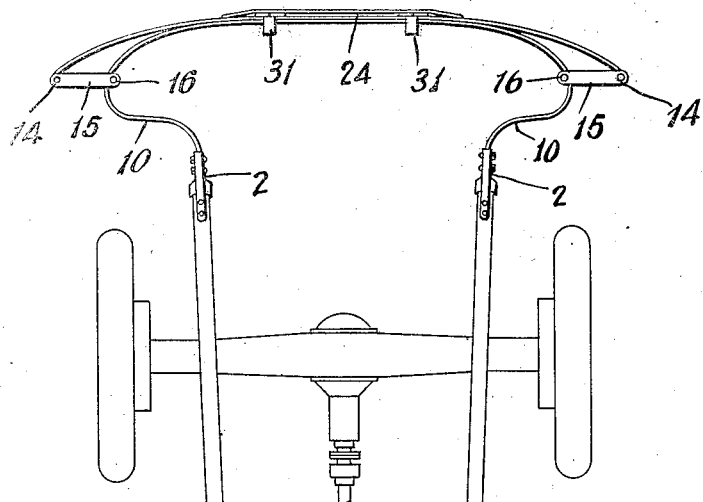
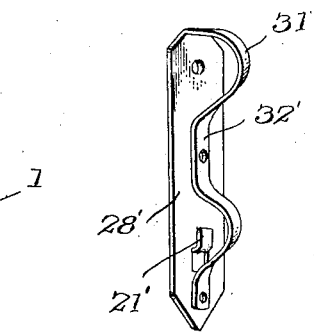
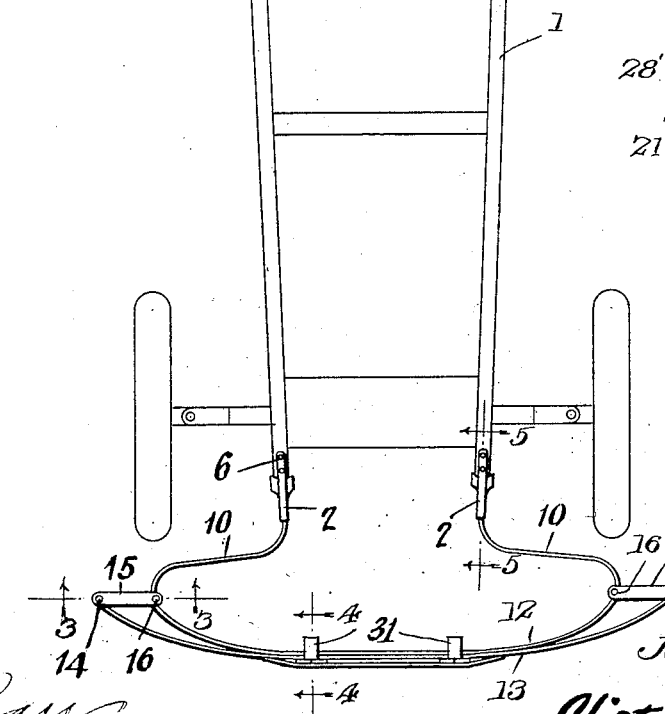

July 14, 1925.
J. B. VIDACH
1,546,331
DOUBLE ACTION UNIVERSAL BUMPER
Filed Aug. 4, 1924     3 Sheets-Sheet 2
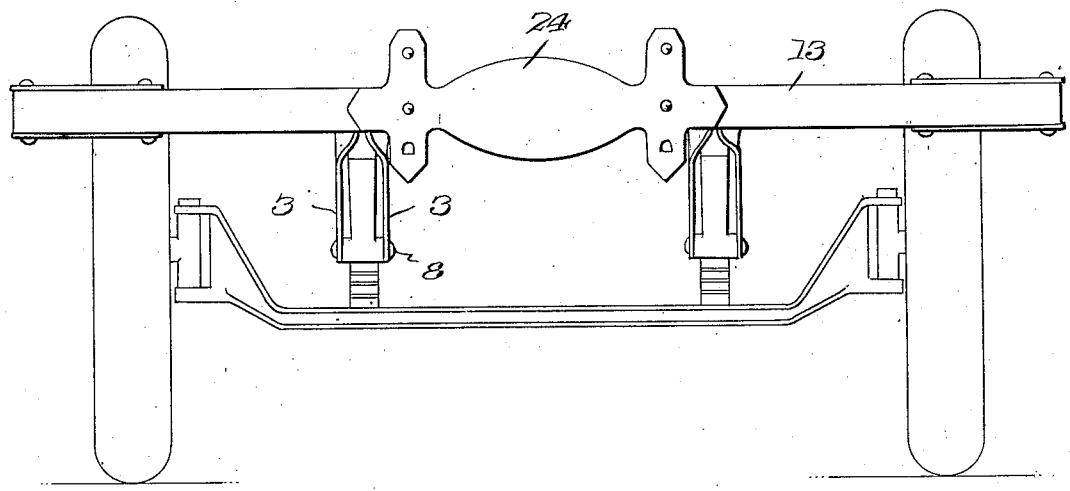
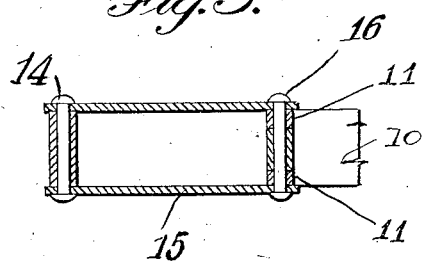
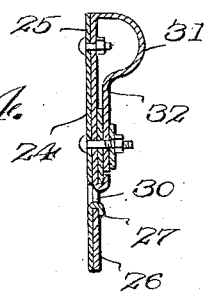
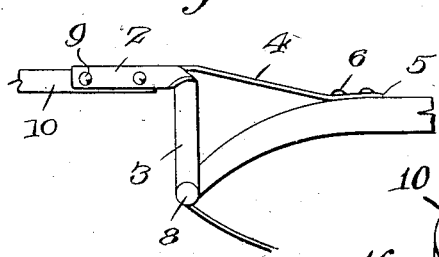
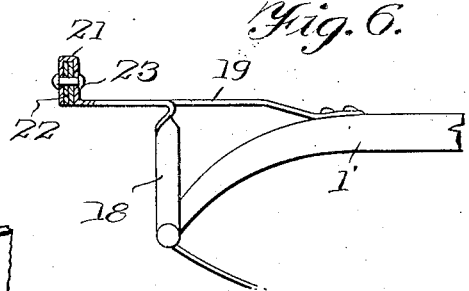
John B. Vidach
INVENTOR

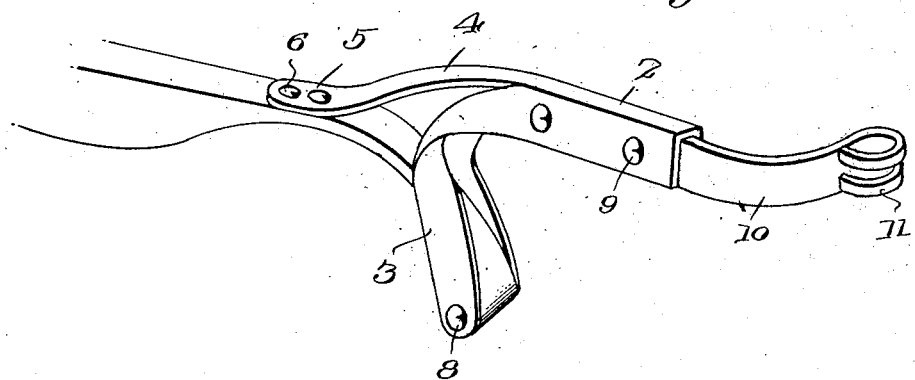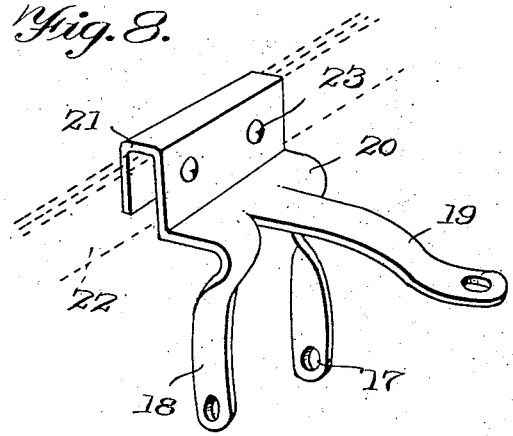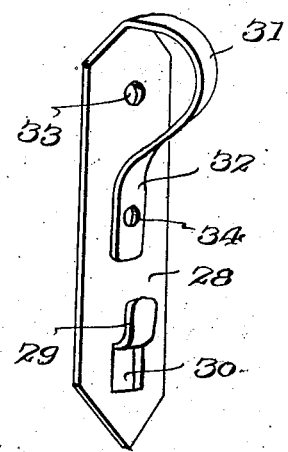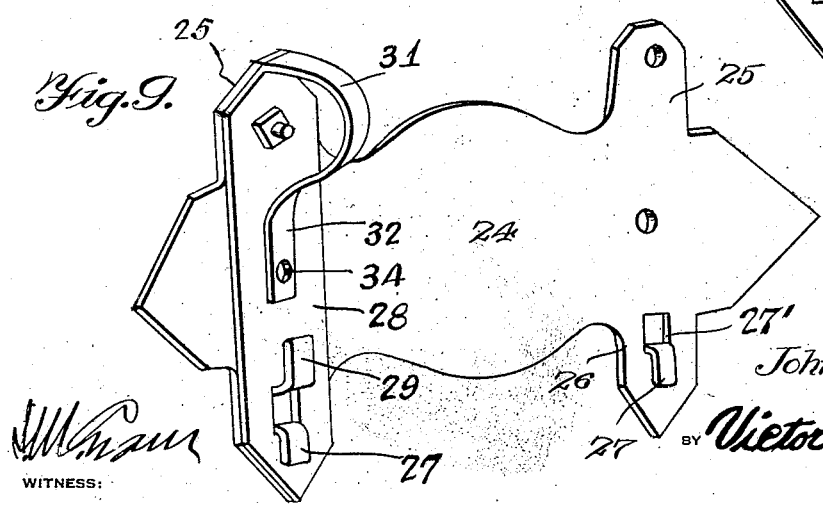

Patented July 14, 1925.

1,546,331

UNITED STATES PATENT OFFICE.

JOHN B. VIDACH, OF CHICAGO, ILLINOIS.

DOUBLE-ACTION UNIVERSAL BUMPER.

Application filed August 4, 1924. Serial No. 730,050.

*To all whom it may concern:*

Be it known that I, JOHN B. VIDACH, a citizen of the United States, residing at Chicago, in the county of Cook and State of Illinois, have invented new and useful Improvements in Double-Action Universal Bumpers, of which the following is a specification.

My present invention has reference to a duplex bumper or buffer for automobiles and other vehicles and my objects are the provision of a novel form of brackets whereby the buffer may be attached to the ends of the frame of the automobile, to provide means for centrally bracing the buffers without interfering with the resiliency thereof, the said bracing means including a plate of an ornamental design and on which the name of the owner of the vehicle may be inscribed and in such other novel features of construction as are illustrated by the drawings, set forth in the following description and pointed out with particularity in the appended claims.

In the drawings:—

Figure 1 is a top plan view of the frame of an automobile illustrating the application of my improvement on the ends thereof.

Figure 2 is a front elevation.

Figure 3 is a sectional view on the line 3—3 of Figure 1.

Figure 4 is a sectional view on the line 4—4 of Figure 1.

Figure 5 is a sectional view on the line 5—5 of Figure 1.

Figure 6 is a view substantially similar to Figure 5 but illustrating a bracket for supporting straight spring buffer plates.

Figure 7 is a perspective view of the bracket construction disclosed in Figure 5.

Figure 8 is a similar view of the bracket construction disclosed in Figure 6.

Figure 9 is a perspective view looking toward the rear of the name plate with one of the clamping members fixed thereto.

Figure 10 is a perspective view of one of the clamping members.

Figure 11 is a similar view illustrating a slight modification of the clamping member.

Figure 12 is a fragmentary perspective view to illustrate the hinge connection between the arched springs and the curved end of the inner spring member of the buffer plate.

To the ends of the side members 1, of the frame of an automobile or like vehicle, I secure brackets of a particular construction.

In the preferred embodiment of my invention each of the brackets includes a channeled body 2 which, from one of its ends being slit in a line with its corners, to provide side arms 3 and a top extension in the nature of an arm 4. The arm 4 is arched downwardly, the end of which, being straight. The straight ends, indicated by the numerals 5, overlie the ends of the frame members 2 and are secured thereon by means 6. The arms 3 are given a half twist from their juncture with the channeled body of the bracket, the said arms straddling the downwardly arched ends of the frame members 1 and are pivotally secured thereto, as at 8. Received in the channeled body portion of each bracket 2 and secured therein by means 9 is the straight end of an outwardly arched spring 10. The springs terminate in eyes 11 which are designed to be pivotally connected to the inwardly curved ends of the inner spring member 12 of the buffer plates. The outer spring buffer plate is indicated by the numeral 13 and has its ends curved inwardly. These ends also terminate in eyes and passing through the said eyes there are pivot members, preferably in the nature of bolts 14, that secure on the said buffer member 13 links 15. The links have passed through their free ends similar pivot members 16 that are directed through the eyes on the end of the inner buffer plate 12 and through the eyes 11 of the arched springs 10. The inner buffer plate 12 is of a less length than the outer buffer plates 13 and the eyes of the spring members 10 are bifurcated to receive therein the eyes on the ends of the said inner buffer plate 12.

When straight spring buffer plates are employed brackets, such as are shown in Figures 6 and 8 of the drawings, are employed. The body portions of these brackets are centrally slit at two points equidistant from the center thereof for a predetermined length and the metal bounded by the slits is beveled to provide depending side arms 18 and a rearwardly arched arm 19 that terminates in a straight end. The arm 19 is secured to the top of the side members 1' of the automobile frame, while the arms 18 are pivotally secured to the downwardly arched ends of the said frame members. At a suitable distance from the arms, the flat body portion 20 of the bracket is extended upwardly, outwardly and downwardly for providing a channeled portion 21 through which the straight buffer plates 22 pass, the channeled portions being provided with openings 23 for the passage of bolts or other elements that secure the buffer plates 22 therein.

In order to brace the spring buffer plates at the center thereof, and, likewise to provide an ornamentation for the buffer I provide a name plate 24. The plate may be of any ornamental design and is provided, adjacent to its ends, with fingers 25—25 and 26—26, respectively. The lower fingers 26 are slit and the metal bounded by the slits is bent inwardly and downwardly to form tongues 27. The openings provided by the slits are indicated by the numerals 27'.

On the inner face of the name plate 24 there are secured clamping members of a peculiar and novel construction. Each of the clamping members includes a straight body portion 28 which is slit both longitudinally and transversely adjacent one of its ends, and the metal bounded by the slit is bent upwardly to form a tongue 29. The opening formed by the slits is indicated by the numeral 30. These openings 30 are designed to receive therethrough the tongues 27 on the name plate 24 while the upstanding tongues 29 and the body of the clamp receives therein the lower edge of the outer spring buffer plate 13. The upper edge of the body of each clamp member 28 is formed with a centrally arranged inwardly rounded spring tongue 31 which terminates in a straight extension 32. The body of each clamp is secured by means 33 to the upper ears 25 of the name plate 24, while the straight ends 32 of the curved spring tongues 31 are secured, by means 34, to the inner buffet plate 12 and to the name plate 24, the said securing means, of course, passing through the body of the clamps.

The pivotal connection between the curved spring members 10 and the inner buffer plate 12, together with the pivoted link connection between these elements and the outer buffer plate 13 permit of a free yielding of the buffer at the ends as well as at the center thereof so that a vehicle equipped with the improvement may contact with an obstacle without liability of injury to his machine or to the obstacle hit by the buffer. The name plate, as previously stated, not only adds to the ornamentality, but together with the clamping members 28 will reinforce and strengthen the spring buffer plates 12 and 13 at the center thereof and also hold the said plates properly related.

In Figure 11 the clamping member is substantially similar to that above described and is broadly indicated by the numeral 28'. The tongue 31' has a straight central portion 32' which is secured to the plate proper and is from thence arched or rounded over the tongue 21' and has a straight end which is riveted to the plate. This reinforces the structure.

It is believed that the foregoing description, when taken in connection with the drawings will fully set forth the construction and advantages of my improvement to those skilled in the art to which such inventions relate, but I desire it to be understood that I am not to be restricted to the device as herein set forth and may make such changes therefrom as fairly fall within the scope of the appended claims.

Having described the invention I claim:—

1. A duplex automobile buffer, comprising inner and outer spring plates having inwardly rounded ends, a shackle pivotally connecting said ends, an inwardly arched spring plate pivoted to each end of the inner buffer plate and connected to the side members of the automobile frame.

2. A duplex automobile buffer comprising inner and outer spring plates, the outer plate being of a greater length than the inner plate and both of said plates having their ends curved inwardly, a shackle pivotally connecting the ends of the said plates, arched springs pivotally secured to the ends of the inner spring buffer plate and connected to the side members of the automobile frame and means arranged at the center of the spring buffer plates for reinforcing the same and holding the said buffer plates properly positioned.

3. A duplex automobile buffer comprising inner and outer spring buffer plates having inwardly curved ends, a shackle pivotally connecting said ends, an inwardly arched spring pivotally secured to each end of the inner spring buffer plate, channeled brackets in which the ends of the said arched springs are received and secured, and angle arms integrally formed on the bracket secured respectively to the sides and to the top of the side members of an automobile frame.

4. A duplex automobile buffer comprising inner and outer spring buffer plates having inwardly curved ends, a shackle pivotally connecting said ends, inwardly arched springs pivotally secured to the inner spring buffer plate and connected to the ends of the side members of the automobile frame, a name plate centrally arranged on the outer buffer plate, clamps on the inner face of the name plate secured thereto and to the spring buffer plates.

5. A duplex automobile buffer comprising inner and outer spring buffer plates having inwardly curved ends, shackles pivotally connecting said ends, spring means connecting the inner buffer plate to the ends of the side members of the automobile frame, a name plate on the outer buffer plate, clamps on the inner face of said name plate, interengaging means between the clamps and the name plate, one of said means supporting the outer buffer plate and removable means securing the name plate and clamps to the buffer plates.

6. A duplex automobile buffer comprising inner and outer spring buffer plates, the outer plate being of a greater length than the inner plate and both of said plates having their ends curved inwardly, shackles pivotally connecting said ends, arched springs pivotally secured respectively to the ends of the inner buffer plate and connected to the ends of the side members of the automobile frame, a name plate arranged centrally on the outer buffer plate, said name plate having extensions adjacent to the ends thereof, and the lower extensions being provided with openings and with downwardly directed tongues, clamps, each including a flat plate having an opening adjacent to the bottom thereof to receive therethrough the mentioned tongues on the name plate and having upwardly extending tongues to receive therein the outer buffer plate, each of said clamps having its upper end curved inwardly and formed with a straight extension to overlie and to be secured to the buffer plates and to the name plate and additional means for securing the clamps to the upper extensions of the name plate.

In testimony whereof I affix my signature.

JOHN B. VIDACH.